US008452248B2

(12) United States Patent
Loyet

(10) Patent No.: US 8,452,248 B2
(45) Date of Patent: May 28, 2013

(54) MULTI-BAND RF COMBINER

(75) Inventor: Lowell Lee Loyet, Woodinville, WA (US)

(73) Assignee: AT&T Mobility II LLC, Altanta, GA (US)

( * ) Notice: Subject to any disclaimer, the term of this patent is extended or adjusted under 35 U.S.C. 154(b) by 608 days.

(21) Appl. No.: 12/613,734

(22) Filed: Nov. 6, 2009

(65) Prior Publication Data

US 2010/0054163 A1 Mar. 4, 2010

Related U.S. Application Data

(63) Continuation of application No. 11/424,639, filed on Jun. 16, 2006, now Pat. No. 7,630,696.

(51) Int. Cl.
*H04B 17/02* (2006.01)

(52) U.S. Cl.
USPC ..................... 455/137; 455/562.1; 455/426.1; 370/282; 370/535; 370/382; 343/840; 343/772

(58) Field of Classification Search
USPC .... 455/137, 562, 426, 562.1, 426.1; 370/282, 370/535, 382; 343/840, 772
See application file for complete search history.

(56) References Cited

U.S. PATENT DOCUMENTS

| | | | | |
|---|---|---|---|---|
| 3,016,536 | A | 1/1962 | Fubini | |
| 5,592,185 | A | 1/1997 | Itabashi et al. | |
| 5,949,382 | A | 9/1999 | Quan | |
| 6,469,677 | B1 | 10/2002 | Schaffner | |
| 6,529,170 | B1 | 3/2003 | Nishizawa et al. | |
| 6,658,263 | B1 | 12/2003 | Ke et al. | |
| 6,734,828 | B2 | 5/2004 | Shor | |
| 6,747,605 | B2 | 6/2004 | Lebaric et al. | |
| 6,859,176 | B2 | 2/2005 | Choi | |
| 6,965,353 | B2 | 11/2005 | Shirosaka et al. | |
| 6,992,632 | B1 | 1/2006 | Mohuchy | |
| 7,181,175 | B2 * | 2/2007 | Nimmo-Smith et al. | 455/101 |
| 7,277,062 | B1 | 10/2007 | Loyet et al. | |
| 7,394,437 | B1 | 7/2008 | Loyet | |
| 7,596,357 | B2 * | 9/2009 | Nakamata et al. | 455/78 |
| 7,630,696 | B2 * | 12/2009 | Loyet | 455/137 |

(Continued)

FOREIGN PATENT DOCUMENTS

| | | | |
|---|---|---|---|
| EP | 0 809 319 | A | 11/1997 |
| EP | 1 158 602 | A | 11/2001 |

(Continued)

OTHER PUBLICATIONS

OA dated Jun. 22, 2007 for U.S. Appl. No. 11/424,664, 12 pages.

(Continued)

*Primary Examiner* — Sanh Phu
(74) *Attorney, Agent, or Firm* — Turocy & Watson, LLP

(57) ABSTRACT

An RF (radio frequency) combiner utilizes RF filtering cavities and transmission paths incorporated into an RF impervious material. This allows traditional stand-alone multiplexers to be integrated into a single device without using signal loss-inducing cables and connections between the multiplexers. The simplicity of the RF combiner allows for RF filters to be milled out of the same RF impervious material without requiring an external RF connection and avoids a cascading of multiple RF filters. In one instance, the RF combiner is employed with two BTS (base transceiver stations) to allow the sharing of antennas without the power losses associated with traditional cascading duplexers.

20 Claims, 6 Drawing Sheets

U.S. PATENT DOCUMENTS

| | | | |
|---|---|---|---|
| 2001/0012788 | A1 | 8/2001 | Gammon |
| 2002/0075906 | A1 | 6/2002 | Cole et al. |
| 2004/0266485 | A1 | 12/2004 | Paramesh et al. |
| 2005/0073456 | A1 | 4/2005 | Sievenpiper et al. |
| 2005/0073465 | A1 | 4/2005 | Olson |
| 2005/0093647 | A1 | 5/2005 | DeCormier et al. |
| 2005/0197095 | A1 | 9/2005 | Nakamata et al. |
| 2006/0068723 | A1 | 3/2006 | Khorram |
| 2007/0008236 | A1 | 1/2007 | Tillery et al. |
| 2007/0063914 | A1 | 3/2007 | Becker |

FOREIGN PATENT DOCUMENTS

| | | | |
|---|---|---|---|
| EP | 1 357 634 | A | 10/2003 |
| EP | 1 544 938 | A | 6/2005 |
| EP | 1 601 112 | A | 11/2005 |
| WO | 98/42040 | A | 9/1998 |
| WO | 2004036785 | A | 4/2004 |
| WO | 2006/058964 | A | 6/2006 |

OTHER PUBLICATIONS

OA dated Nov. 9, 2007 for U.S. Appl. No. 11/843,673, 13 pages.

OA dated Aug. 24, 2009 for U.S. Appl. No. 11/424,614, 26 pages.

International Search Report dated Dec. 7, 2007 for PCT Application Serial No. US0771413, 2 pages.

International Search Report dated Nov. 17, 2008 for PCT Application Serial No. US0771414, 2 pages.

International Search Report and Written Opinion for PCT Application Serial No. US0771415, mailed Sep. 30, 2008, 12 pages.

OA dated Feb. 26, 2009 for U.S. Appl. No. 11/424,614, 22 pages.

Nortel Networks, "GSM 900/1800/1900 Univity GSM Base Transceiver Station eCell" (2002) Product Bulletin, 2 pages.

Katherin, "UMTS Antennas from the World's Largest Antenna Supplier" (1999) Product-Marketing, Mobile Communication Antennas, 4 pages.

Nokia, "Transmission Solution for Nokia Mobile Networks" (2000) Product Bulletin, 4 pages.

Katherin, "Technical Information and New Products: Cellular Systems" located at www.katherin.de/de/mca/technifos/download/9985654.pdt, last viewed Oct. 23, 2006, 16 pages.

OA dated Nov. 18, 2008 for U.S. Appl. No. 11/424,639, 15 pages.

OA dated May 27, 2009 for U.S. Appl. No. 11/424,639, 19 pages.

Supplementary European Search Report Dated May 8, 2009 for Application No. EP 07 84 0256, 8 pages.

Supplementary European Search Report Dated Oct. 15, 2009 for Application No. EP 07 84 5210, 8 pages.

European Search Report dated May 12, 2009 for Application No. EP 07 79 8675, 7 pages.

OA dated Dec. 1, 2009 for U.S. Appl. No. 11/424,614, 11 pages.

EP OA dated Jan. 13, 2010 for European Patent Application No. 07845210.9, 1 page.

Canadian Office Action for CA Application Serial No. 2648259, mailed Jan. 19, 2011, 3 pages.

OA dated Jun. 28, 2010 for U.S. Appl. No. 12/163,823, 32 pages.

* cited by examiner

MULTI-BAND RF COMBINER

RELATED APPLICATIONS

This application is a continuation of U.S. patent application Ser. No. 11/424,639, filed on Jun. 16, 2006, entitled "MULTI-BAND RF COMBINER", which is related to co-pending and co-assigned U.S. applications entitled "MULTI-RESONANT MICROSTRIP DIPOLE ANTENNA," filed on Jun. 16, 2006 and assigned Ser. No. 11/424,664, which issued U.S. Pat. No. 7,277,062 on Oct. 27, 2007 and "MULTI-BAND ANTENNA," filed on Jun. 16, 2006 and assigned Ser. No. 11/424,614, the entireties of which are incorporated herein by reference.

BACKGROUND

Wireless telephones and other wireless devices have become almost the defacto standard for personal and business communications. This has increased the competition between wireless service providers to gain the largest possible market share. As the marketplace becomes saturated, the competition will become even tougher as the competitors fight to attract customers from other wireless service providers.

As part of the competition, it is necessary for each wireless service provider to stay abreast of technological innovations and offer their consumers the latest technology. However, not all consumers are prepared to switch their wireless devices as rapidly as technological innovations might dictate. The reasons for this are varied and may range from issues related to cost to an unwillingness to learn how to use a new device or satisfaction with their existing device.

However, certain technological innovations may require different antenna technologies in order to deliver service to the wireless customer. For example, although Wide-Band Code-Division Multiple Access (WCDMA) and Global System for Mobile communications (GSM) technologies typically operate on different frequencies, and they may require separate antennas, a wireless provider may have customers using both types of technologies. Thus, the wireless provider must have a means to combine different RF signals to allow signal duplexing with different types of technology over the same antennas. Traditional means of RF combining have inherent power degradations due to physical limitations that require connections and RF cabling to interconnect the RF combiner topology.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter provides an RF (radio frequency) combiner with integrated multiplexers. The RF combiner utilizes RF filtering cavities and transmission paths incorporated into an RF opaque material. This allows traditional stand-alone multiplexers to be integrated into a single device without using signal loss-inducing cables and connections between the multiplexers. The simplicity of the RF combiner allows for RF filters to be milled out of the same RF material without requiring an external RF connection and avoids a cascading of multiple RF filters. In one instance, the RF combiner is employed with two BTS (base transceiver stations) to allow the sharing of antennas without the power losses associated with traditional cascading duplexers. Thus, the RF combiner allows for the maximum RF performance through minimization of RF insertion losses and VSWR (voltage standing wave ratio) degradations while also reducing size and weight.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
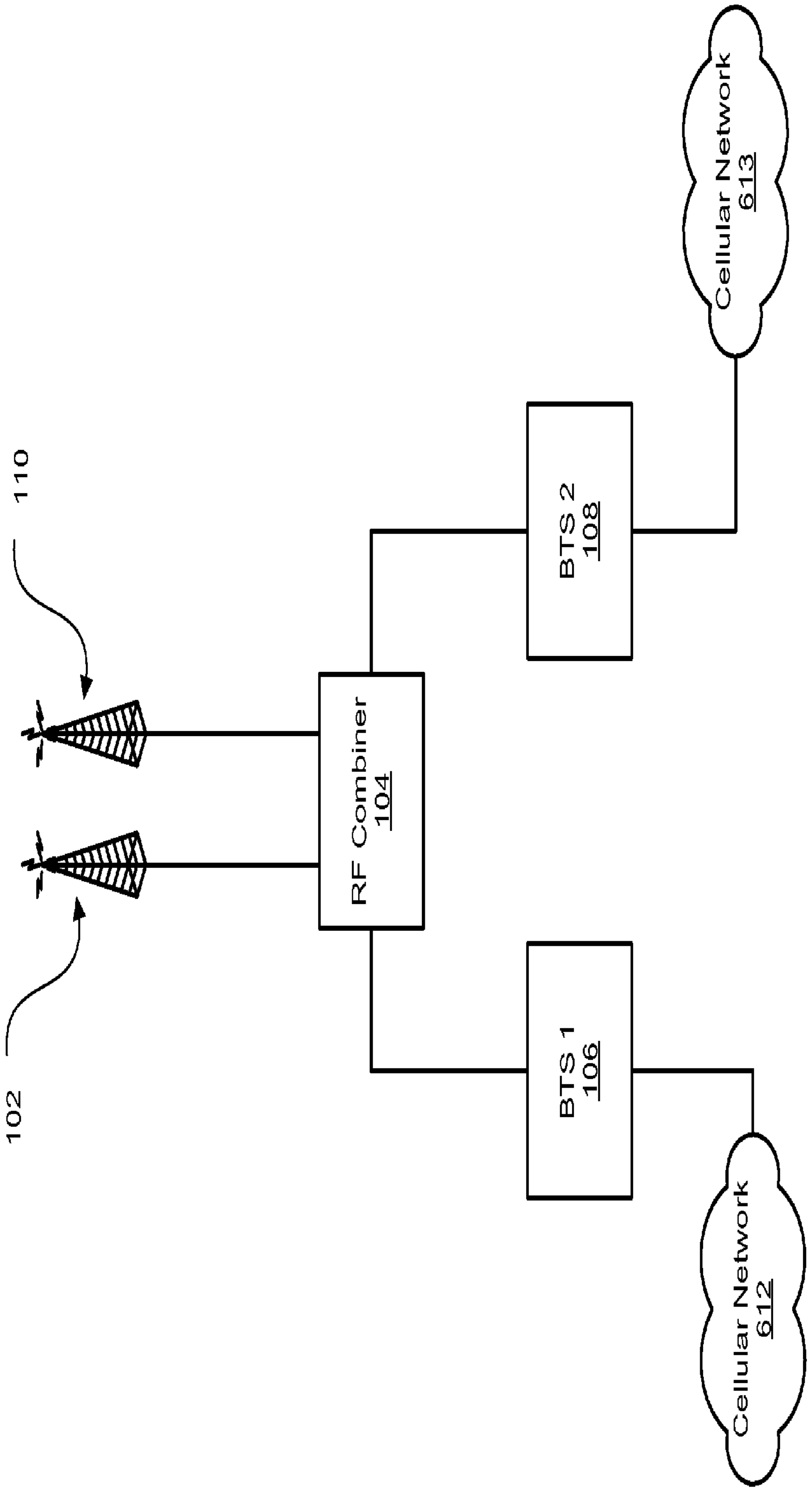
FIG. 1 is a diagram illustrating the coupling of antennas and two cellular networks in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

In FIG. 1, a diagram illustrating the coupling of antennas 102, 110 and two cellular networks 612, 613 (see FIG. 6) in accordance with an aspect of an embodiment is shown. Each of cellular networks 612 and 613 is coupled to a respective base transceiver station (BTS) 106 and 108. A BTS may also be referred to as a base station or a cell site and is the central radio transmitter/receiver that maintains communications with mobile radiotelephone sets within a given range via an antenna. BTS 1 106 and BTS 2 108 are coupled to the antennas 102, 110 via RF combiner 104. RF combiner 104 combines the signals from BTS 1 106 and BTS 2 108 to allow reception and/or transmission of signals over both antennas 102, 110 by both BTS 1 106 and BTS 2 108. This allows both cellular networks 612 and 613 to broadcast as if they each had their own set of antennas 102, 110 (as if there were four total antennas). Each of these communication signals is associated with the two different types of cellular networks 612 and 613 operates at a different frequency from the other. The antennas 102, 110 then broadcast both signals to be received by wireless devices within the area covered by the antennas 102, 110.

In addition to transmitting signals, the antennas 102, 110 also receive signals from wireless devices in a designated area. For example, these signals can be on one of two frequency bands, each of which is associated with at least one of the cellular networks 612 and 613. These received signals are transmitted from the antennas 102, 110 to the RF combiner 104 which decouples the signals and sends the appropriate signal to each of the BTS 1 106 and BTS 2 108. These are then sent to the appropriate receiving party via cellular network 612 and/or cellular network 613.

RF combiners are particularly useful for mating old technology with new technology such as, for example, GSM technology that requires antenna sharing with older technology. The RF combiner 104 can, for example, make two physical antennas look like four antennas to a pair of BTS's. Each BTS then sees two antennas that it is not sharing with any other BTS. Antenna sharing is defined as multiple technologies using the same existing antennas for their transmission and receive paths. This requires a unique combination of filtering components to allow for the sharing of the antennas. Many wireless operators are currently faced with zoning and leasing challenges of deploying many antennas for different technologies on the same sector at the cell sites. The RF filter combiner 104 allows for this to be achieved with minimal RF performance degradations.

The RF combiner 104 provides a simplified design layout for an RF combining system used for the antenna sharing. This RF combiner layout design allows for optimal RF performance that is not achievable with standard off-the-shelf RF combiners when connected together with RF coax cables. Thus, this RF combiner layout technique can provide for all internal RF combiner connections and eliminates RF performance degradations caused by RF cables and connectors.

Figure 2:
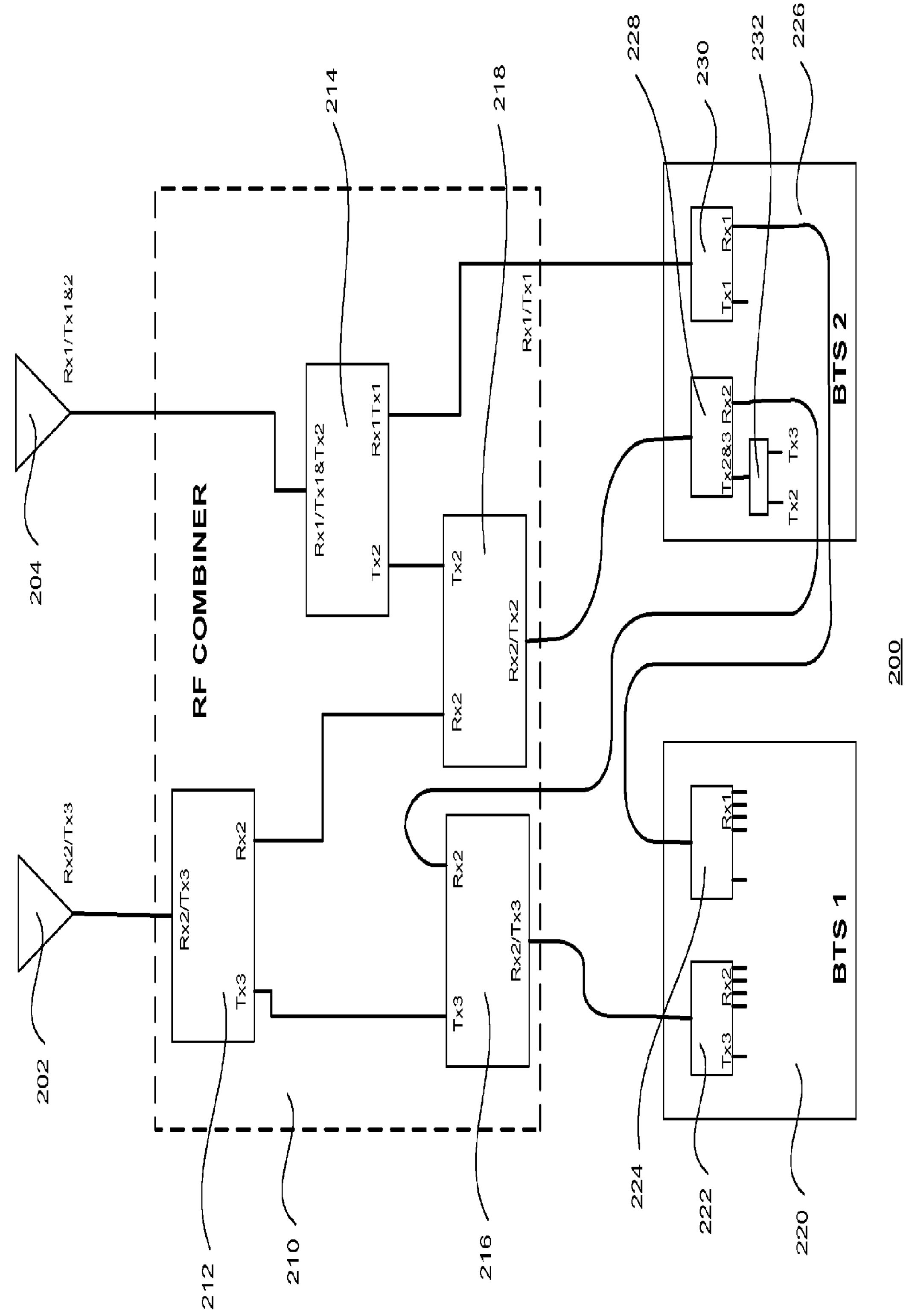
FIG. 2 is a schematic diagram illustrating an RF combiner in accordance with an aspect of an embodiment.
Figure 3:
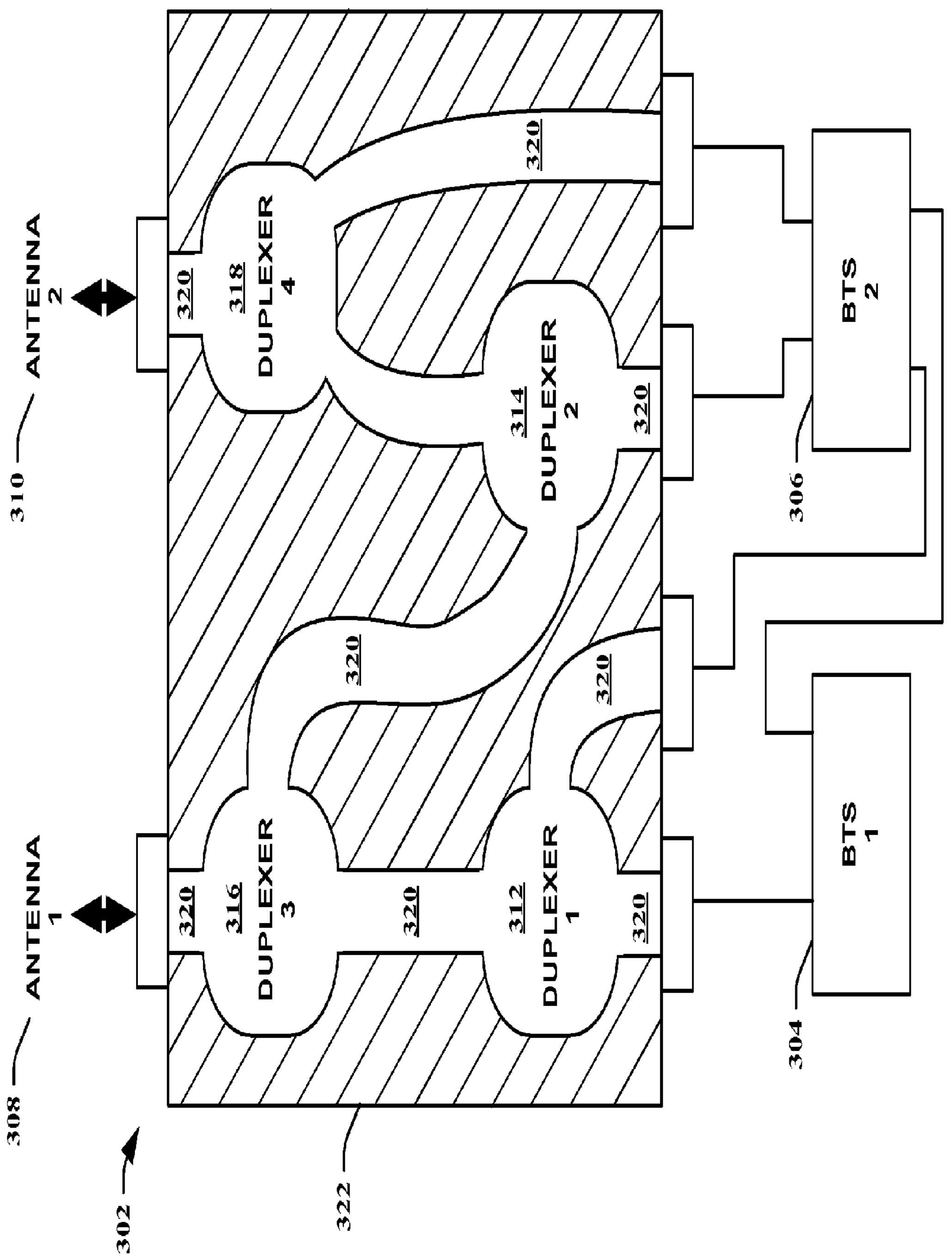
FIG. 3 is an illustration of an example RF combiner milled into a metal block in accordance with an aspect of an embodiment.

Looking at FIG. 2, a schematic diagram 200 illustrating an RF combiner 210 is depicted in accordance with an aspect of an embodiment. RF combiner 210 can be implemented as, for example, RF combiner 104 depicted in FIG. 1. FIG. 2 represents a functional illustration of RF combiner 210 while FIG. 3 represents a physical illustration of RF combiner 302. In this instance, the RF combiner 210 is comprised of duplexers 212-218 that facilitate in allowing transmissions and receptions from antennas 202 and 204 (each tuned to a particular frequency—e.g., 850 MHz, 1900 MHz) by BTS 1 220 and BTS 2 226. The arrangement of signals in the RF combiner 210 balances the delay of the receive and transmit paths. BTS 1 220 has transmit and receive modules 222, 224 that interact with the RF combiner 210 and BTS 2 226 transmit and receive modules 228-232. The transmit and receive modules 228-232 of BTS 2 226 also interact with the RF combiner 210. The RF combiner 210 then performs RF combining on the signals so that BTS 1 220 and BTS 2 226 can interact with both antennas 202, 204 as if the antennas 202, 204 only exist for each BTS. In this example, BTS 1 220 can represent, for example, a WCDMA (wide-band code-division multiple access) BTS and BTS 2 226 can represent, for example, a GSM (global system for mobile communications) BTS. In effect, the RF combiner 210 provides "logical" antennas to each of the BTS 1 and 2 220, 226. That is, each of the BTS 1 and 2 220, 226 sees two antennas as if they are not sharing the antennas (i.e., appears as if there are four antennas total). The BTS 1 and 2 220, 226 are cross-coupled to allow the RF combiner 210 to function with only one RF combining stage for each RF signal.

RF combiner 210 is designed for a minimal number of RF components which are interconnected in the design so that no RF coax connections are required. This design also allows for the maximum RF performance in the RF combiner 210 to minimize the RF insertion losses and VSWR (voltage standing wave ratio) degradations while reducing the size and the weight. One feature that contributes to the simplicity of this RF combiner 210 layout is that it takes advantage of fundamental multiplexer (e.g., duplexer) designs and advances the layout design so that no RF path is required to go through more than one RF combining stage. Without the RF combiner 210 disclosed herein, multiple RF combining stages are required, which has the disadvantage of creating RF performance degradations. The simplicity of the RF combining design allows for the filters to be milled out of the same metal material without requiring any external RF connections and avoids the cascading of multiple RF filters.

In FIG. 3, an illustration of an example RF combiner 302 milled into a metal block 322 in accordance with an aspect of an embodiment is shown. The RF combiner 302 interacts with antennas 1 and 2 308, 310 and BTS 1 and 2 304, 306 via duplexers 1-4, 312-318. The duplexers 1-4, 312-318 are RF filter cavities that are milled into the metal block 322. RF transmission paths 320 connect the duplexers 1-4, 312-318 to each other, to the antennas 1 and 2 308, 310, and/or to BTS 1 and 2, 304, 306. The RF transmission paths 320 milled into the metal block 322 allow the elimination of cabling and connectors between the duplexers 1-4, 312-318, substantially reducing RF power losses. Sizing of the RF cavities for the duplexers 1-4, 312-318 and the RF transmission paths 320 can be varied to facilitate in appropriate RF filtering and maximum power transfer. The RF combiner 302 also substantially reduces the size and weight of a typical RF combiner by employing this type of construction. This also substantially increases the reliability of the RF combiner 302 because fewer parts are utilized, and there is less chance of environmental impacts such as, for example, corrosion of connectors and/or cutting of cables and the like.

It can be appreciated that with the increased simplicity of the example RF combiners discussed above, that more complex types of RF combiners can be constructed as well. The duplexer based RF combiners 210, 302 in FIGS. 2 and 3 can be expanded utilizing other configurations of multiplexers as well. This allows for substantial size and weight reductions along with higher reliability in more complex RF combiners. For example, antenna space and locations are often limited. Multi-band antennas are frequently utilized in these situations. Multi-band antennas are antennas that can transmit and/or receive more than one band of frequencies from a single antenna structure. RF combiners with multiplexers can be utilized to facilitate in connecting multiple transceivers to these types of antennas. Two examples of such antennas are discussed below.

Figure 4:
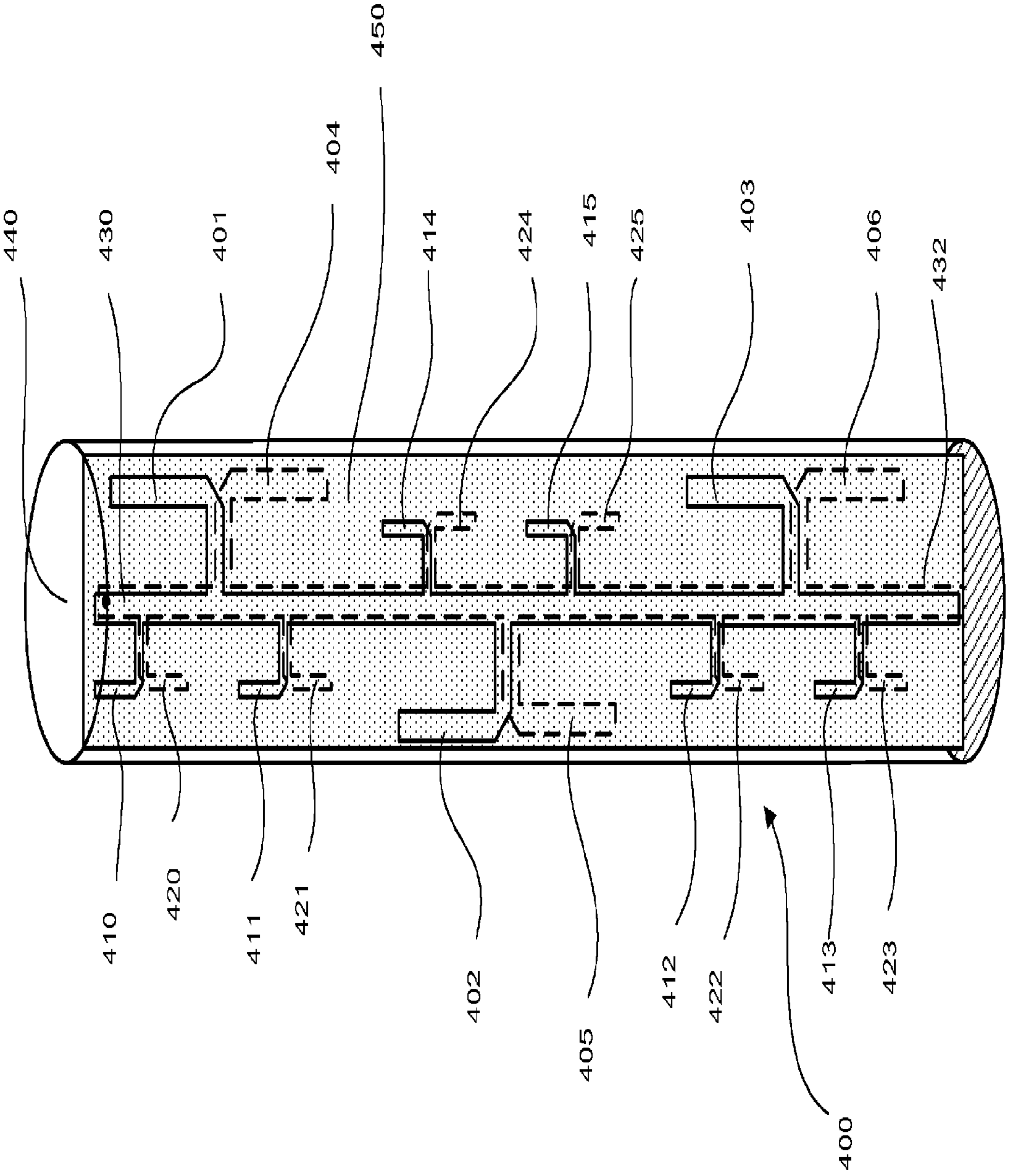
FIG. 4 is a side view of a multi-band antenna in accordance with an aspect of an embodiment.

Referring to FIG. 4, a side view of a dual-band antenna is depicted in accordance with an aspect of an embodiment. Dual-band antenna 400 can be implemented as, for example, antenna 102 depicted in FIG. 1. Dual-band antenna 400 is a microstrip dual-band collinear array with dipole elements 401-406, 410-415, and 420-425 arranged on both sides of microstrips 430 and 432 and on both sides of a dielectric substrate 450. The elements 401-403, 410-415, and 430 on a first side of the dual-band antenna 400 are illustrated with solid lines and the elements 404-406, 420-425, and 432 on the second side of the dual-band antenna separated from the first side by a dielectric substrate 450 are represented by dashed lines in FIG. 4.

The dual-band antenna 400 comprises large and small dipoles each of which corresponds to one of the modes of the antenna. The large dipoles comprise corresponding dipole elements 401 and 404, 402 and 405, and 403 and 406. The small dipoles comprise corresponding dipole elements 410 and 420, 411 and 421, 414 and 424, 415 and 425, 412 and 422, and 413 and 423. Each dipole contains a dipole element on the first side of the dielectric substrate 450 and a second element on the second side of the dielectric substrate separated from each other by the dielectric substrate 450 such as, for example the dipole which contains a dipole element 401 on the first side of the dielectric substrate 450 and a dipole element 404 on the second side of the dielectric substrate 450. The two bands of operation from the dual-band antenna 400 could be, for example cellular 850 MHz and PCS (personal communications services) 1900 MHz Frequency bands where the larger dipole elements, such as, for example, dipole element 401, radiate the 850 MHz signal and the smaller dipole elements, such as, for example, dipole element 410, radiate the 1900 MHz signal.

The ground and pin signals received from, for example, the RF combiner 210 in FIG. 2 are placed on respective ones of microstrip feedlines 430 and 432. The feed structure for feeding the ground and pin signals from the RF combiner 210 in FIG. 2 can be designed to be, for example, a microstrip, a stripline, or a coax design with a single RF connector at one end of the dual-band antenna 400. The dual-band antenna can also have a cylindrical radome 440 placed over the antenna structure for weather proofing.

In one modification to the dual mode antenna 400, the shorter dipoles can be laid out so that they are on both sides of the main feedlines 430 and 432 and the longer dipoles could also be laid out so that they are on both sides of the microstrip feedlines 430 and 432. An example of such a modification can be achieved by replacing shorter dipole elements 410-411 and 420-421 with a single larger set of corresponding dipole elements of substantially equivalent size as dipole elements 401 and 404; replacing longer dipole elements 402 and 405 with two pairs of corresponding shorter dipole elements similar to dipole elements 414-415 and 424-425; and replacing shorter dipole elements 412-413 and 422-423 with a pair of corresponding longer dipole elements. Such a modification can provide a more omni-like radiation pattern.

Figure 5:
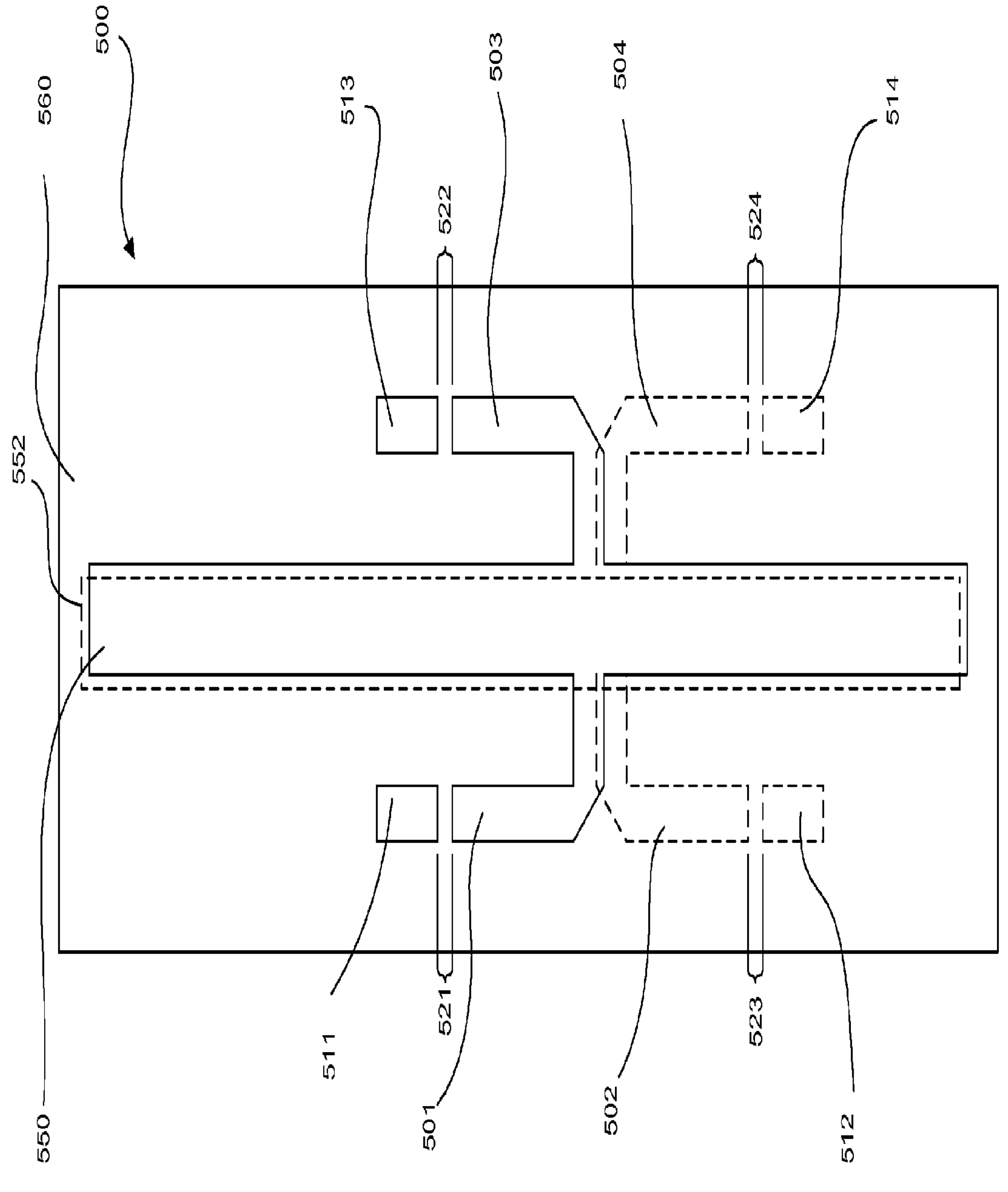
FIG. 5 is a side view of a multi-band antenna utilizing dipole gaps in accordance with an aspect of an embodiment.

Turning to FIG. 5, a side view of a multi-band antenna 500 in accordance with an aspect of an embodiment is depicted. The multi-band antenna 500 can be employed as, for example, antenna 102 depicted in FIG. 1. The multi-band antenna 500 is a microstrip multi-band collinear array with dipole elements 501-504 and 511-514 arranged on both sides of serial feedlines 550 and 552 and both sides of a dielectric material 560. The dielectric material 560 can be any RF dielectric such as, for example, a PTFE (polytetrafluoroethylene)/fiberglass composite. The elements 501, 503, 511, 513, and 550 on a first side of the multi-band antenna 500 are illustrated with solid lines and the elements 502, 504, 512, 514, and 552 on the second side of the multi-band antenna separated from the first side by the dielectric material 560 are represented by dashed lines in FIG. 5.

Serial feedlines (also referred to as microstrips) 550 and 552 and dipole elements 501-504 and 511-514 are constructed from a metal such as, for example, copper and the like. A pattern is etched and/or otherwise formed into each side of the dielectric material 560 corresponding to the locations of the serial feedlines 550 and 552 and the dipole elements 501-504 and 511-514 on that side of the dielectric material 560. Metal is then deposited into the pattern to form the feedlines 550 and 552 and the dipole elements 501-504 and 511-514. In the alternative, a metal sheet, such as, for example, copper, is attached and/or deposited on each side of the dielectric. The dipole element and feedline pattern is then formed by printing an acid resistant mask onto the metal and using an acid bath to remove the unpatterned metal.

The impedance of the serial feedlines 550 and 552 should approximately match the impedance of a transmission line carrying RF signals from a transmitter and/or to a receiver. For a coaxial transmission line, this impedance is typically around 50 ohms. The impedance of the dipole elements 501-504 and 511-514 should be approximately that of free space (i.e., approximately 377 ohms).

Dipole element 501 and dipole element 502 on the opposite side of dielectric material 560 form a dipole for a given first wavelength of radiation/reception. Similarly, dipole elements 503 and 504 also form a dipole for the same wavelength of radiation/reception since the dipole formed by dipole elements 503 and 504 has an approximately equivalent length to the dipole formed by dipole elements 501 and 502. A gap 521-524 exists between dipole elements 501-504 and their corresponding dipole elements 511-514. For shorter wavelengths, the gaps 521-524 form an open circuit between dipole elements 501-504 and dipole elements 511-514. However, for longer wavelengths, if the gaps 521-524 are chosen correctly, the gaps 521-524 are effectively short circuited so that a longer dipole equal in length, for example, to the combined lengths of dipole elements 501-502, dipole elements 511-512, and gaps 521 and 523. Thus, dipole elements 501-502 and 511-512 form a dipole for a second wavelength of radiation longer than that of the first wavelength dipole. Therefore, the multi-band antenna 500 functions on two bands (i.e., two different wavelengths). The multi-band antenna 500 can also have a cylindrical radome (not shown) placed over the antenna structure for weather proofing. The multi-band antenna 500 is presented as an example of a multi-band antenna and is not meant to imply any architectural limitations.

The antennas depicted in FIGS. 4 and 5 are examples of multi-band antennas with dual bands that can be employed with various RF combiners disclosed herein. Dual-band antennas have been shown for simplicity of explanation. However, these antennas are presented and intended only as examples of a multi-band antenna and not as architectural limitations with regard to utilization with the RF combiners disclosed herein. It is appreciated that the antennas presented above can be extended to antennas having three, four, or more operation bands by adding additional dipole elements of lengths corresponding to the additional bands desired and/or additional gaps in the dipoles.

Figure 6:
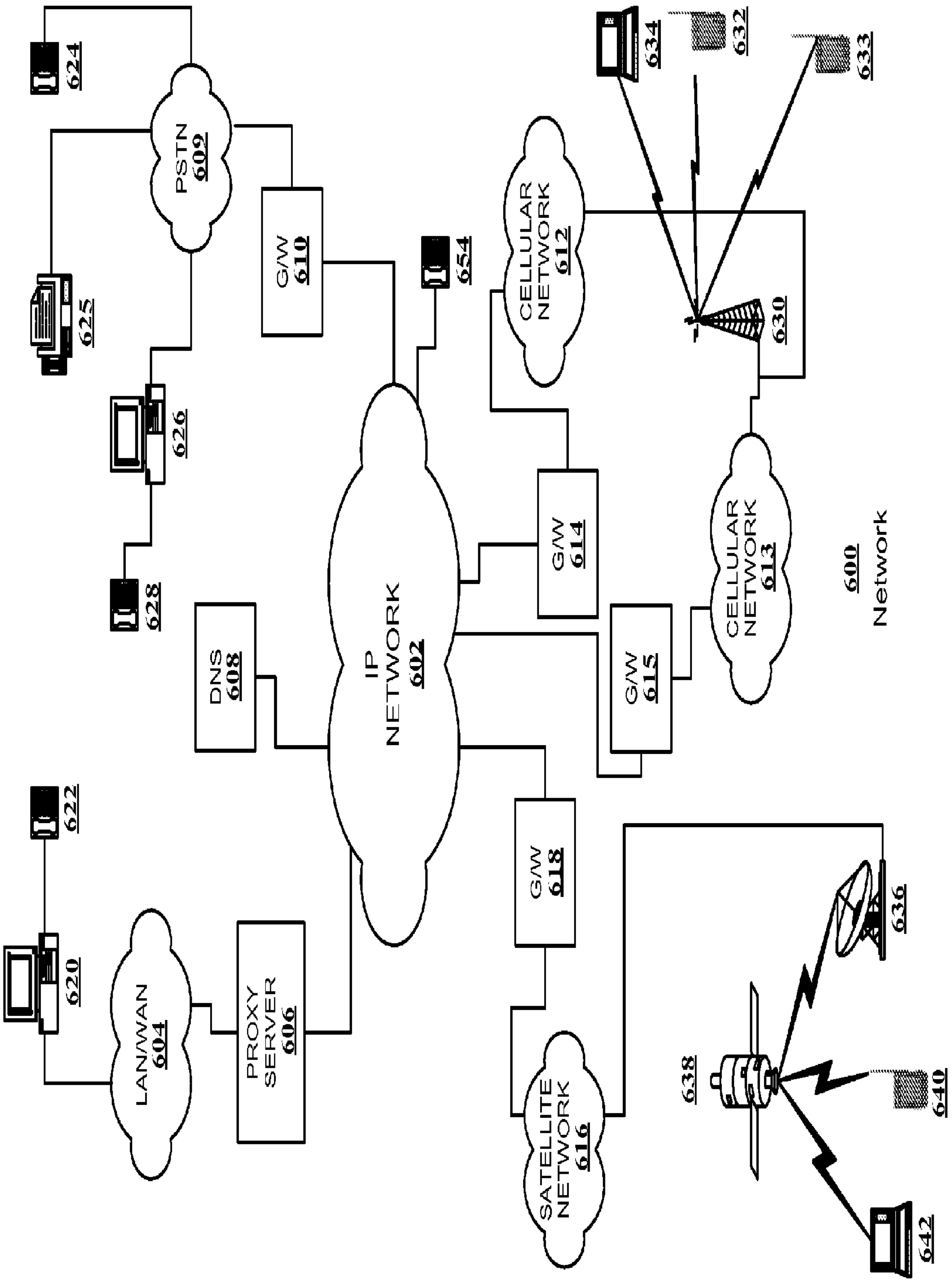
FIG. 6 is a system diagram illustrating a communication system in accordance with an aspect of an embodiment.

In order to provide additional context for implementing various aspects of the embodiments, FIG. 6 and the following discussion are intended to provide a brief, general description of a suitable communication network 600 in which the various aspects of the embodiments can be performed. It can be appreciated that the inventive structures and techniques can be practiced with other system configurations as well.

In FIG. 6, a system diagram illustrating a communications network 600 in accordance with an aspect of an embodiment is depicted. The communications network 600 is a plurality of interconnected heterogeneous networks in which instances provided herein can be implemented. As illustrated, communications network 600 contains an Internet Protocol (IP) network 602, a Local Area Network (LAN)/Wide Area Network (WAN) 604, a Public Switched Telephone Network (PSTN) 609, cellular wireless networks 612 and 613, and a satellite communication network 616. Networks 602, 604, 609, 612, 613 and 616 can include permanent connections, such as wire or fiber optic cables, and/or temporary connections made through telephone connections. Wireless connections are also viable communication means between networks.

IP network 602 can be a publicly available IP network (e.g., the Internet), a private IP network (e.g., intranet), or a combination of public and private IP networks. IP network 602 typically operates according to the Internet Protocol (IP) and routes packets among its many switches and through its many transmission paths. IP networks are generally expandable, fairly easy to use, and heavily supported. Coupled to IP network 602 is a Domain Name Server (DNS) 608 to which queries can be sent, such queries each requesting an IP address based upon a Uniform Resource Locator (URL). IP network 602 can support 32 bit IP addresses as well as 128 bit IP addresses and the like.

LAN/WAN 604 couples to IP network 602 via a proxy server 606 (or another connection). LAN/WAN 604 can operate according to various communication protocols, such as the Internet Protocol, Asynchronous Transfer Mode (ATM) protocol, or other packet switched protocols. Proxy server 606 serves to route data between IP network 602 and LAN/WAN 604. A firewall that precludes unwanted communications from entering LAN/WAN 604 can also be located at the location of proxy server 606.

Computer 620 couples to LAN/WAN 604 and supports communications with LAN/WAN 604. Computer 620 can employ the LAN/WAN 604 and proxy server 606 to communicate with other devices across IP network 602. Such communications are generally known in the art and are described further herein. Also shown, phone 622 couples to computer 620 and can be employed to initiate IP telephony communications with another phone and/or voice terminal using IP telephony. An IP phone 654 connected to IP network 602 (and/or other phone, e.g., phone 624) can communicate with phone 622 using IP telephony.

PSTN 609 is a circuit switched network that is primarily employed for voice communications, such as those enabled by a standard phone 624. However, PSTN 609 also supports the transmission of data. PSTN 609 can be connected to IP Network 602 via gateway 610. Data transmissions can be supported to a tone based terminal, such as a FAX machine 625, to a tone based modem contained in computer 626, or to another device that couples to PSTN 609 via a digital connection, such as an Integrated Services Digital Network (ISDN) line, an Asynchronous Digital Subscriber Line (ADSL), IEEE 802.16 broadband local loop, and/or another digital connection to a terminal that supports such a connection and the like. As illustrated, a voice terminal, such as phone 628, can couple to PSTN 609 via computer 626 rather than being supported directly by PSTN 609, as is the case with phone 624. Thus, computer 626 can support IP telephony with voice terminal 628, for example.

Cellular networks 612 and 613 support wireless communications with terminals operating in their service area (which can cover a city, county, state, country, etc.). Each of cellular networks 612 and 613 can operate according to a different operating standard utilizing a different frequency (e.g., 850 and 1900 MHz) as discussed in more detail below. Cellular networks 612 and 613 can include a plurality of towers, e.g., 630, that each provide wireless communications within a respective cell. At least some of the plurality of towers 630 can include a multi-band antenna that employs an RF combiner disclosed herein to allow a single antenna to service both networks' 612 and 613 client devices. Wireless terminals that can operate in conjunction with cellular network 612 or 613 include wireless handsets 632 and 633 and wirelessly enabled laptop computers 634, for example. Wireless handsets 632 and 633 can be, for example, personal digital assistants, wireless or cellular telephones, and/or two-way pagers and operate using different wireless standards. For example, wireless handset 632 can operate via a TDMA/GSM standard and communicate with cellular network 612 while wireless handset 633 can operate via a UMTS standard and communicate with cellular network 613 Cellular networks 612 and 613 couple to IP network 602 via gateways 614 and 615 respectively.

Wireless handsets 632 and 633 and wirelessly enabled laptop computers 634 can also communicate with cellular network 612 and/or cellular network 613 using a wireless application protocol (WAP). WAP is an open, global specification that allows mobile users with wireless devices, such as, for example, mobile phones, pagers, two-way radios, smart phones, communicators, personal digital assistants, and portable laptop computers and the like, to easily access and interact with information and services almost instantly. WAP is a communications protocol and application environment and can be built on any operating system including, for example, Palm OS, EPOC, Windows CE, FLEXOS, OS/10, and JavaOS. WAP provides interoperability even between different device families.

WAP is the wireless equivalent of Hypertext Transfer Protocol (HTTP) and Hypertext Markup Language (HTML). The HTTP-like component defines the communication protocol between the handheld device and a server or gateway. This component addresses characteristics that are unique to wireless devices, such as data rate and round-trip response time. The HTML-like component, commonly known as Wireless Markup Language (WML), defines new markup and scripting languages for displaying information to and interacting with the user. This component is highly focused on the limited display size and limited input devices available on small, handheld devices.

Each of Cellular network 612 and 613 operates according to an operating standard, which can be different from each other, and which may be, for example, an analog standard (e.g., the Advanced Mobile Phone System (AMPS) standard), a code division standard (e.g., the Code Division Multiple Access (CDMA) standard), a time division standard (e.g., the Time Division Multiple Access (TDMA) standard), a frequency division standard (e.g., the Global System for Mobile Communications (GSM)), or any other appropriate wireless communication method. Independent of the standard(s) supported by cellular network 612, cellular network 612 supports voice and data communications with terminal units, e.g., 632, 633, and 634. For clarity of explanation, cellular network 612 and 613 have been shown and discussed as completely separate entities. However, in practice, they often share resources.

Satellite network 616 includes at least one satellite dish 636 that operates in conjunction with a satellite 638 to provide satellite communications with a plurality of terminals, e.g., laptop computer 642 and satellite handset 640. Satellite handset 640 could also be a two-way pager. Satellite network 616 can be serviced by one or more geosynchronous orbiting satellites, a plurality of medium earth orbit satellites, or a plurality of low earth orbit satellites. Satellite network 616 services voice and data communications and couples to IP network 602 via gateway 618.

FIG. 6 is intended as an example and not as an architectural limitation for instances disclosed herein. For example, communication network 600 can include additional servers, clients, and other devices not shown. Other interconnections are also possible. For example, if devices 632, 633, and 634 were GPS-enabled, they could interact with satellite 638 either directly or via cellular networks 612 and 613.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:

transmitting, from a plurality of base station devices, a plurality of radio frequency signals via a first radio frequency transmission path formed from a first radio frequency waveguide milled into a block of radio frequency impervious material;

multiplexing, utilizing a radio frequency resonating cavity milled into the block of radio frequency impervious material, the plurality of radio frequency signals into a multiplexed radio frequency signal; and transmitting the multiplexed radio frequency signal via a second radio frequency transmission path formed from a second radio frequency waveguide milled into the block of radio frequency impervious material to an antenna.

2. The method of claim 1, wherein the multiplexing further comprises duplexing the plurality of radio frequency signals.

3. The method of claim 1, wherein the block of radio frequency impervious material is a block of radio frequency impervious metal.

4. The method of claim 1, wherein the block of radio frequency impervious material is a block of aluminum.

5. The method of claim 1, wherein the plurality of radio frequency signals comprise a first radio frequency signal in a first frequency band and a second radio frequency signal in a second frequency band.

6. The method of claim 5, wherein the first frequency band comprises an about 850 megahertz frequency band and the second frequency band comprises an about 1900 megahertz frequency band.

7. A method, comprising:

transmitting a multiplexed radio frequency signal comprising a plurality of radio frequency signals to a radio frequency resonating cavity milled into a block of radio frequency impervious material via a first transmission path of a first radio frequency waveguide milled into the block of radio frequency impervious material; and demultiplexing the plurality of radio frequency signals from the multiplexed radio frequency signal via the radio frequency resonating cavity to form a plurality of demultiplexed radio frequency signals corresponding to the plurality of radio frequency signals for transmission through a second transmission path formed from a second radio frequency waveguide milled into the block of radio frequency impervious material.

8. The method of claim 7, wherein the demultiplexing further comprises deduplexing the plurality of multiplexed radio frequency signals.

9. The method of claim 7, wherein the block of radio frequency impervious material is a block of radio frequency impervious metal.

10. The method of claim 7, wherein the block of radio frequency impervious material is a block of aluminum.

11. The method of claim 7, further comprising transmitting a first radio frequency signal of the plurality of demultiplexed radio frequency signals in a first frequency band and transmitting a second radio frequency signal of the plurality of demultiplexed radio frequency signals in a second frequency band.

12. An apparatus, comprising:

a first radio frequency transmission path formed from a first radio frequency waveguide milled into a block of radio frequency impervious material that receives a plurality of radio frequency signals from a plurality of base station devices;

a radio frequency multiplexer created from a radio frequency resonating cavity milled into the block of radio frequency impervious material that facilitates a combination of the plurality of radio frequency signals into a combined signal comprising the plurality of radio frequency signals; and a second radio frequency transmission path formed from a second radio frequency waveguide milled into the block of radio frequency impervious material that transmits the combined signal to an antenna.

13. The apparatus of claim 12, wherein the block of radio frequency impervious material is a block of radio frequency impervious metal.

14. The apparatus of claim 13, wherein the block of radio frequency impervious material is a block of aluminum.

15. The apparatus of claim 12, wherein the plurality of radio frequency signals comprise a first radio frequency signal in a first frequency band and a second radio frequency signal in a second frequency band.

16. The apparatus of claim 15, wherein the first frequency band is an about 850 megahertz frequency band and the second frequency band is an about 1800 megahertz frequency band.

17. The apparatus of claim 12, wherein the radio frequency multiplexer comprises a radio frequency duplexer.

18. The method of claim 1, wherein the radio frequency resonating cavity comprises a plurality of cavities milled into the radio frequency impervious material to facilitate multiplexing the plurality of radio frequency signals.

19. The method of claim 7, wherein demultiplexing further comprises passing the multiplexed radio frequency signal through a plurality of cavities milled into the radio frequency impervious material to facilitate the demultiplexing.

20. The apparatus of claim 12, wherein the radio frequency multiplexer comprises a plurality of cavities milled into the radio frequency impervious material.

* * * * *